BRIGGS & TALBOTT.
Neck-Yoke.
No. 11,717.  Patented Sept. 26, 1854.
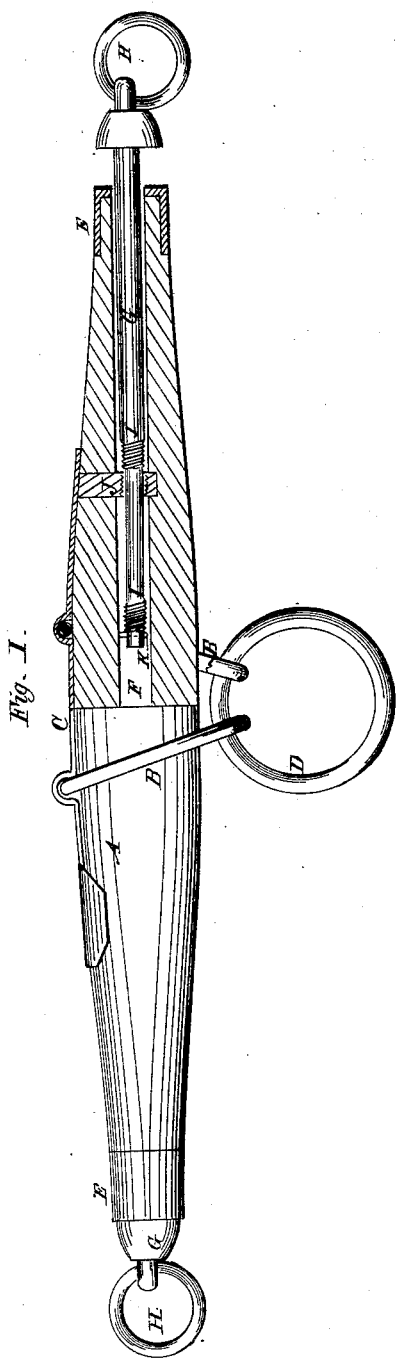

UNITED STATES PATENT OFFICE.

SCHUYLER BRIGGS AND JOHN G. TALBOT, OF SLOANSVILLE, NEW YORK.

NECK-YOKE.

Specification of Letters Patent No. 11,717, dated September 26, 1854.

*To all whom it may concern:*

Be it known that we, SCHUYLER BRIGGS and JOHN G. TALBOT, both of Sloansville, in the county of Schoharie and State of New York, have invented a new and useful Neck-Yoke; and we do hereby declare the same are described and represented in the following specifications and drawings.

To enable others skilled in the art to make and use our invention we will proceed to describe its construction and use referring to the drawing in which the figure is a representation of our neck yoke the left hand portion of the bar being represented in section to show the interior.

The nature of our invention consists in cutting sections of a screw upon each of the rods which carry the end rings which sections of a screw are fitted to nuts or female screws fastened in the bar of the yoke, so that the rods may be readily secured in different positions in the bar so as to make one end short and the other long, or both ends either short or long as required for service.

In the accompanying drawing it is the bar of the yoke, surrounded by two rings B B near its center, which are held in their proper places by the strap C, fastened to the bar A by screws or otherwise. These two rings are connected together by the ring D which may be put onto, or fastened to the end of the pole or tongue of the vehicle or thing to be drawn.

The rings E E are fitted to the ends of the bar A which bar is perforated as represented at F to receive the rods G G which are made in the form represented and carry the rings H H through which the breast chains or straps may be inserted in the usual manner. The rods G G are each about half as long as the bar A and are provided with sections of a screw as represented at I I' fitted to the nut or female screw J fastened in the bar A by the strap C or otherwise. When the screw I is in the nut J that end of the yoke will be short, and it may be made long by unscrewing the screw I and bringing the screw I' into the nut J and turning it so as to bring the pin K against the nut J which will prevent the rod G from being taken out unless the pin is removed.

The advantages of our improved yoke are that when the roads are bad it may be used its full length, so as to allow the horses to avoid deep ruts or holes thereby enabling them to draw a larger load. When the roads are good it may be used short, when one horse is stronger than the other it may be used with one long and one short end.

What we claim as our invention and desire to secure by Letters Patent in the above described neck yoke is—

Making two or more sections of a screw on each of the rods which carry the end rings in combination with the nuts in the bar of the yoke, so that it may be used with one end short and the other long or both ends either long or short as may be necessary or desirable substantially as described.

SCHUYLER BRIGGS.
JOHN G. TALBOT.

Witnesses:
J. M. SHONT,
JAS. B. McMASTER.